United States Patent [19]

Poetsch et al.

[11] 4,418,358

[45] Nov. 29, 1983

[54] METHOD AND SYSTEM TO CORRECT COLOR ERRORS IN COLOR TELEVISION SIGNALS GENERATED BY SCANNING A FILM

[75] Inventors: Dieter Poetsch, Ober-Ramstadt, Fed. Rep. of Germany; Armand Belmares-Sarabia, 4250 Veterans Hwy., Holbrook, N.Y. 11741

[73] Assignees: Robert Bosch GmbH, Stuttgart, Fed. Rep. of Germany; Armand Belmares-Sarabia, Holbrook, N.Y.

[21] Appl. No.: 204,883

[22] Filed: Nov. 7, 1980

[51] Int. Cl.³ .............................................. H04N 9/535
[52] U.S. Cl. .......................................... 358/80; 258/54
[58] Field of Search .............................. 358/54, 75–80, 358/214, 215, 216, 21, 22

[56] References Cited

U.S. PATENT DOCUMENTS

| | | | |
|---|---|---|---|
| 3,610,815 | 10/1971 | Gould | 358/21 R |
| 4,060,829 | 11/1977 | Sakamoto | 358/80 |
| 4,096,523 | 6/1978 | Belmares-Serabia | 358/80 |
| 4,288,818 | 9/1981 | Poetsch | 358/214 |
| 4,312,017 | 1/1982 | Poetsch | 358/214 |

*Primary Examiner*—Robert L. Richardson
*Attorney, Agent, or Firm*—Frishauf, Holtz, Goodman & Woodward

[57] ABSTRACT

In order to achieve color correction of color television signal generated by a film scanner which includes a scanning device and a digital frame store, correction means are arranged before and after a frame store. Correction data are stored during a first film run and reproduced during a second film run, e.g. when the film is televised. The correction may be performed during motion and still motion of the film without increasing of quantization errors.

20 Claims, 2 Drawing Figures

METHOD AND SYSTEM TO CORRECT COLOR ERRORS IN COLOR TELEVISION SIGNALS GENERATED BY SCANNING A FILM

The invention relates to a system for modifying the color characteristics of video signals produced from film by a television film scanner.

BACKGROUND OF THE INVENTION

Color films are frequently of different color quality, and variations may even occur during a single film. Thus it is necessary to provide color television film scanners with color correction systems. According to systems well known in the art first of all the color films are observed and according to the visual impression thus obtained the transmission characteristics of the transmission means connected in the paths of the signals are adjusted to cause a reduction in the color errors. Simultaneously these correction factors are stored upon an information carrier. Later, when the films are played back, the correction factors are reproduced from the information carrier and are delivered to the transmission means in such a manner that the transmission characteristics thereof are influenced to cause a reduction in the color errors.

These systems are normally connected to the outputs of the film scanners, like so-called flying-spot-film scanners or film scanners including pick-up tubes.

SUMMARY OF THE INVENTION

The purpose of the present invention is to offer a color correction system which is adapted to a film scanner comprising a digital frame store.

It is an object of the invention to prevent enlargement of quantization errors which are unavoidable by using digital stores, due to extreme non-linear corrections which might be necessary in order to correct gamma errors of the film, especially negative film; or due to over-proportional amplification of one or more component signal (e.g. B-Y).

It is another object of the invention to correct color errors while the film is not in continuous motion. This provides an operator with enough time to make corrections in an optimum manner at the commencement of each scene.

Briefly, in accordance with the invention, first signal correction means are arranged between a scanning device and the digital store and second signal correction means are connected to the output of the digital store, correction data provided during a first or preview run of the film being stored together with film position information, and retrieved and applied to the scanning signals during a second, or display run, e.g. when the film is being televised.

DESCRIPTION OF THE DRAWINGS

The invention will now be explained in more details with reference to the figures of the accompanying drawings therein.

In FIG. 1, reference 1 indicates a film scanning device such as a CCD (charged coupled device) including all circuits to operate this device, e.g. pre-amplifiers. In a known film scanner this device comprises 3 CCDs, one for each color component. The light from a light source 2 passes through a condensor lense 3, the film 4, an objective lense 5, and a neutral density filter 6 to the scanning device 1.

Figure 1:
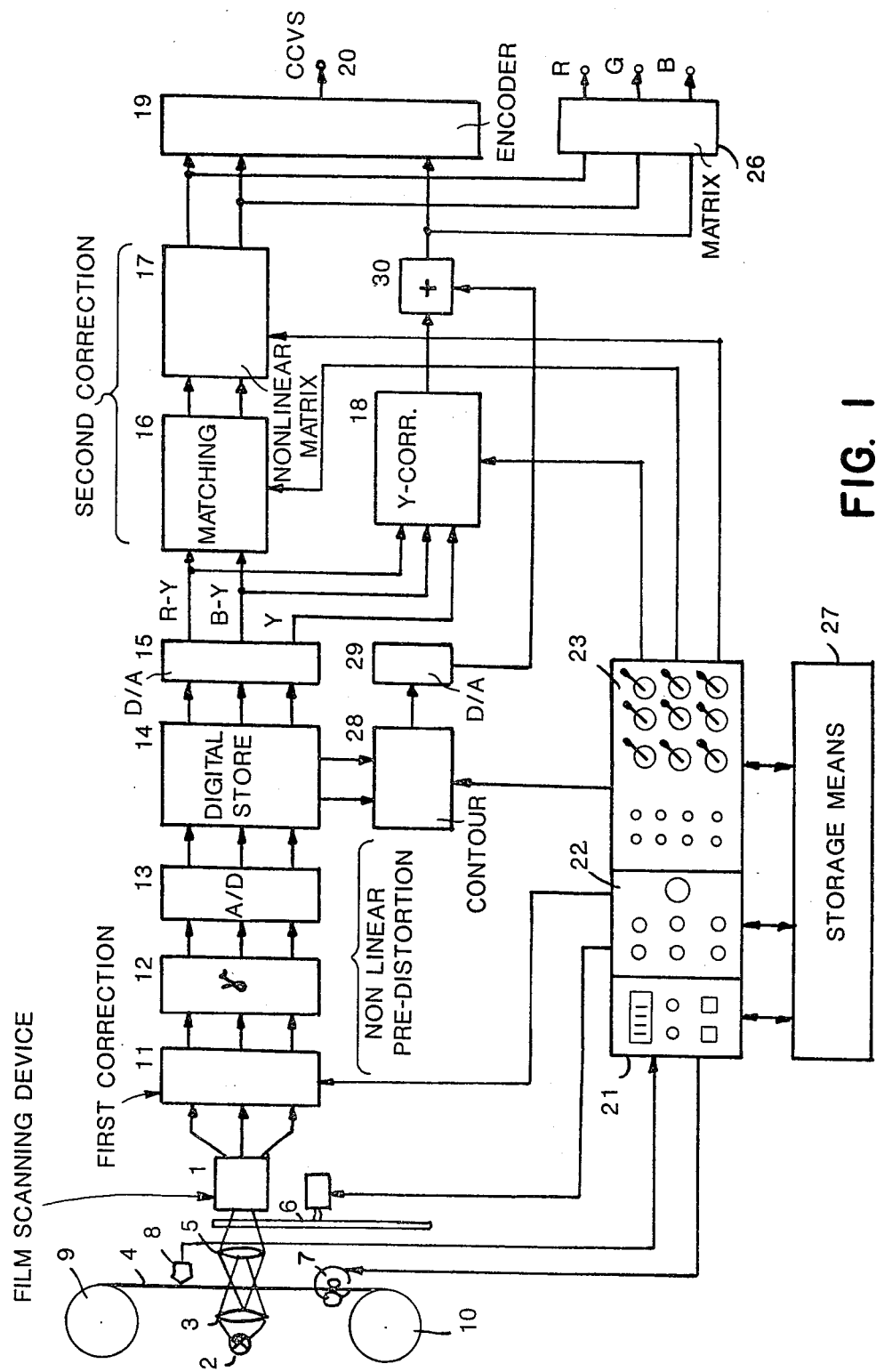
FIG. 1 is a schematic block diagram of a first embodiment of the invention.

The film 4 is transported by a capstan 7; a well-known indicator 8 indicates the film position. Other parts of the film scanners are well-known and are not shown in FIG. 1 since the explanation of such parts is not necessary for the understanding of the invention. The color component signals RGB are supplied to first signal correction means 11 then to non-linear pre-distortion means 12 and after being converted to digital signals by means of an analogue-to-digital converter 13 written in the store 14. The store 14 is a digital store having a capacity of at least one TV frame. By means of a digital-to-analogue converter 15, the output signals of the store 14 are converted into analogue signals and supplied via second signal correction means 16,17,18 to the encoder 19. At the output of the encoder 19, a composite color video signal (CCVS) is available. The signals R-Y, B-Y, and Y are also supplied to a matrix 26 to produce color component signals R, G, and B.

The operation of the film scanner is controllable by remote-control means 21. While the film 4 is moving, the film is scanned line by line by the scanning device 1. The output signals of the scanning device 1 do not conform with the television standard especially with respect to interlacing and line frequency. By an appropriate control of the write and read process of the store 14, signals are generated which comply with a television standard e.g. the NTSC standard.

Details thereof are described in the U.S. patent application Ser. No. 928,783, now U.S. Pat. Nos. 4,288,818, Sept. 8, 1981 and 4,312,017, Jan. 19, 1982, Poetsch.

In digital video systems 8 bit coding is commonly used. This is a compromise between the requirements of minimum quantization errors and of economical construction of digital stores and of analogue-to-digital and, respectively, digital-to-analogue converters. Such 8 bit coding is used in the known CCD film scanner. Upon connection of the well-known color correction systems with the output of such a film scanner, quantization errors which are invisible when transmitting the output signals without any amplitude distortion become visible by amplifying the amplitude of one or more output signals during the color correction process. With respect to these errors, color correction would be preferable before the analogue-to-digital conversion.

However, the scanning device 1 generates only output signals when the film is moving. Therefore, the setting of the color correction by controlling the output signals of the scanning device 1 is not possible during still, or stopped motion operation mode. To permit the operator in order to perform corrections as carefully as possible it may be necessary to correct a single frame. To obtain the advantage of both possibilities, i.e. to correct a running film or a single frame, the system according to the embodiment of the invention of FIG. 1 comprises signal correction means before and after the store. The signal correction means 11 which are arranged between the scanning device and the normal gamma predistortion circuit 12 provides coarse correction of the color errors. The circuit 12 compensates for the non-linear response of the picture tube of the television receivers. The remaining color errors which do not require a substantial stretching of the amplitude response are corrected by second correction means 16, 17, and 18 in the paths of the signals being read out of the store 14. Another correction which of course is to be done before the store is the setting of the neutral density filter 6 which is remote controlled by a motor 25 from the remote control panel 22.

The signal correction means 11,16,17, and 18 are remote controllable by the control panels 22 and 23.

The control panel 22 comprises controls for the white and black level of the color component signals R, G, and B and a control for the neutral density filter. These controls enable a coarse correction which is primarily necessary for negative films but can also be applied with positive films. Since the correction requirements of a negative film deviate from those of positive film, the control panel 22 comprises pre-adjustment and storage means for average correction values of negative film.

The second signal correction means comprise luminance, or Y correction means 18 and chrominance matching correction means 16 and 17. The luminance correction means 18 provide for correction of gamma, black, and white of the luminance signal Y and are remote-controllable by means of the control panel 23.

In addition of this the color difference signals R-Y and B-Y are supplied to the luminance correction means in order to change the luminance matrixing formula which normally is $$Y = 0.3R + 0.59G + 0.11B.$$

In the chrominance path two chrominance correction circuits are arranged. The first one 16 allows individual matching and control of gamma, black, and white of the color difference signals, the second one 17 comprises essentially a non-linear matrix which enables the separate correction of different colors. The chrominance correction means are remote-controllable by the control panel 23 having for each such color one joy-stick.

In order to enhance the contours of pictures reproduced by such film scanner, a contour corrector 28 is provided for. Since the vertical contour correction requires a comparison between the amplitudes of the luminance signals of three adjacent lines the contour enhancer is directly connected to the store 14. The output of the contour enhancer 28 is connected to the input of a second digital-to-analogue converter 29 the output signal of which is added to the luminance signal by means of an adder 30 after the luminance signal has been corrected.

Operation

During a first or preview run of the film 8, the controls are adjusted scene by scene or if necessary frame by frame, adjustment of the controls is in the sense of a reduction in the color errors. The setting of this adjustment of the controls is stored in the form of data in the storage means 27, e.g. punched tape or floppy discs as used in the known color correction systems.

During a second run of the film for television purpose, the correction information data stored in the storage means 27 retrieved. The film is then run a second time. During the second run of the film, for television display purpose, 8 and supplied to the first and second signal correction means 11,16,17, and 18. thus the output signal of the system according to FIG. 1 is automatically color corrected.

Within the scope of the invention, the second signal correction means can be realized by digital signal processing means, e.g. multiplying circuits and can be arranged between the frame store 14 and the D/A-converter 15.

The neutral density filter may be operated automatically by deriving a control signal from the output signals of the scanning device; alternatively, the amplitude of the signal can be electronically automatically adjusted by an automatic gain control, as it is well known in the art. In this case the position of the neutral density filter may be stored automatically together with the manually adjusted correction data.

Since the effect of the corrections applied to the signals before the store can be observed only while the film is moving, in some cases for example at normal preview speed the duration of one scene may be too short to perform even a coarse correction. Therefore, the film may be moved or reciprocated forwardly and backwardly repeatedly by one or more frames for the time required for the correction of the signals before storage of the signals for the frame store is effected.

Film position indicator 8 is, for example, a sensor responding to the film sprocket holes coupled to a counter, counting holes from a reference position. The first and second signal correction means 11, and 16, 17, 18, respectively, comprise black and white level control, gamma control for each individual color signal (red, R; green, G; and blue, B) and master control means 22, 23 for black, gain, and gamma (Y) and the matrix 17. The first signal correction means 11 corrects black and white level control for each individual color signal. Additionally, it can include basic alignment for negative film. The output signal of the opto-electronic scanner 1 is supplied to the digital store 14 with a master gamma of about 1. The signals are A/D converted in converter 13 and utilize at least an 11-bit linear quantization response. The non-linear predistortion device 12 supplies the output signal from the scanning device to the digital store 14 after non-linear predistortion and an 8-bit quantization. The section correction means include distortion means with an inverse function with respect to the predistortion. The predistortion device 12 provides an amplitude distortion function according to standard television gamma.

Figure 2:
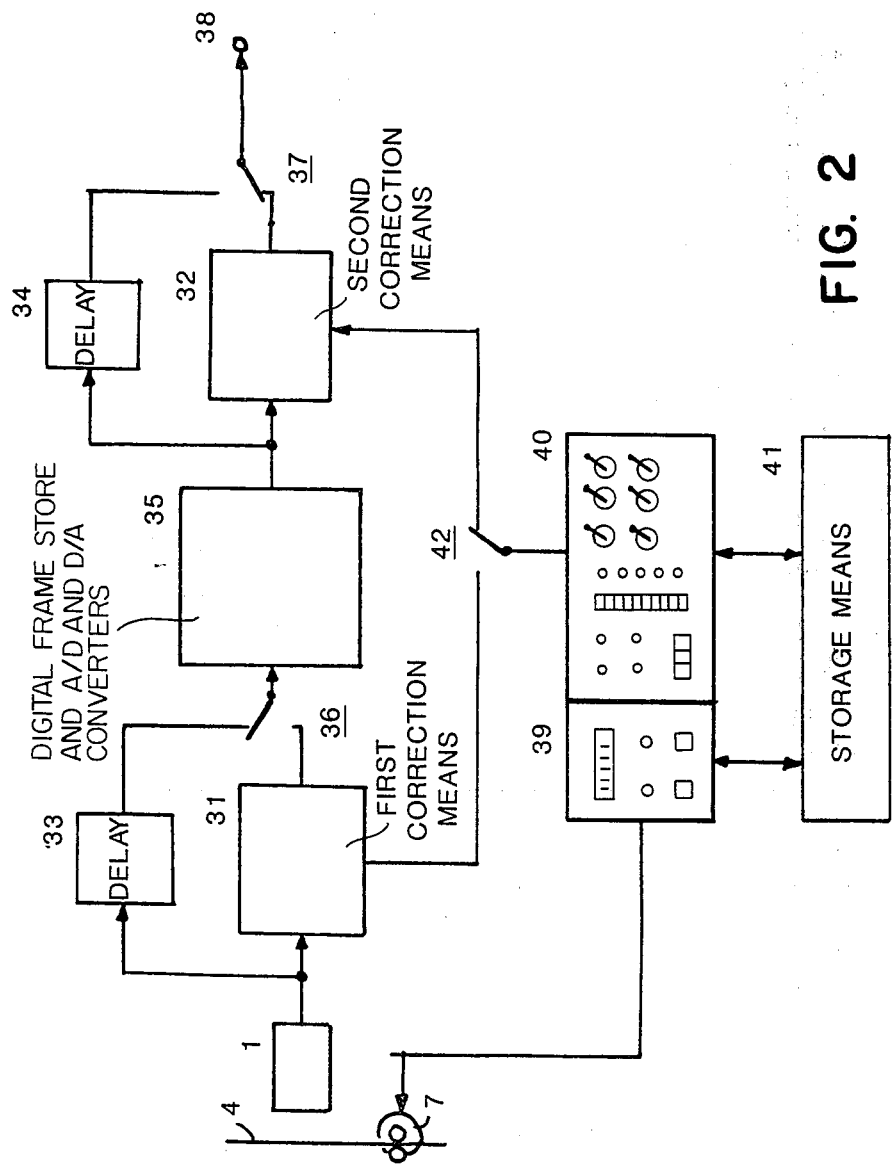
FIG. 2 shows a schematic block diagram of a second embodiment of the invention.

FIG. 2 shows a second embodiment of the invention. The scanning device 1, the film 4, and the capstan device 7 are similar to those of FIG. 1.

The store 35 comprises a frame store and associated equipment like D/A- and A/D-converters. The first correction means are equal to the second correction means and have similar functions as the correction means shown in FIG. 1.

The delay devices 33 and 34 have the same delay time as the correction means 31 and 32. The control panels 39 and 40 and the storage means 41 are basically equal to the panels 21, 22, and 23 and the storage means 27 of FIG. 1.

During a first run of the film 4, the switches 36, 37, and 42 are in the position shown in FIG. 2. Only the second correction means are effective. The output signals are displayed by connecting a color TV monitor to the output 38. Color errors are corrected by operating the controls of the panel 40. If an extended adjustment is necessary, the film can be stopped and the correction of the output signals of the store 35 can be done as long as necessary.

During a second film run the switches 36, 37, and 42 are changed over to the not-shown position. The second correction means are disconnected. Only the first correction means are effective. Correction data are read out of the storage means 41 correspondingly to the film movement and control the first correction means in the same way as the second correction means were controlled during the first run.

In view of quantization errors this correction method is satisfactory since disturbing quantization errors may occur only during the first run when the signals are observed for correction purposes but not transmitted.

Besides the color correction a control of the degree of contour enhancement can be done during the first film run. Therefor the contour enhancer 28 (FIG. 1) receives a control signal from the control panel 23. This control signal can be stored together with the color correction data and reproduced during the second film run according to the film movement.

Color correction of television scenes reproduced from film is described in U.S. Pat. No. 4,096,523, Belmares Sarabia et al. and also in U.S. Pat. No. 3,610,815 describing the system known as "Chromaloc" TM, to the disclosures of which reference is made.

We claim:

1. A Color Correction System for a television film scanner which includes an opto-electronic scanning device (1) providing scanned color component signals and a digital store (14) comprising
first signal correction means (11) connected to receive the scanned signals from said scanning device, and being connected between said scanning device (1) and said digital store (14); and second signal correction means (16, 17, 18) being connected to the output of the digital store (14).

2. A System according to claim 1, comprising light control means 6 being arranged between the film and the scanning device.

3. A System according to claim 1 wherein said first (11) and second (16, 17, 18) signal correction means comprise black and white level control, gamma control for each individual color signal (red, green, and blue), and master control means (22, 23) for black, gain, and gamma, and matrix means.

4. A System according to claim 3, wherein first signal correction means comprise black and white level control for each individual color signal.

5. A System according to claims 3 or 4 wherein said first signal correction means comprise basic alignment means for negative film.

6. A System according to claim 1, wherein the output signals of the opto-electronic scanning device are supplied to the digital store (14) with a master gamma of about 1 and wherein said signals are analogue-to-digital converted using at least an 11 bits linear quantization response.

7. A System according to claim 1, including non-linear predistortion means (12);
and wherein the output signals of said scanning device are supplied to the digital store (14) after non-linear predistortion and an 8 bit quantization.

8. A system according to claim 7, wherein the second correction means include distortion means with an inverse function with respect to said predistortion means.

9. A System according to claim 7, wherein said predistortion means (12) provide an amplitude distortion function according to the standard television gamma.

10. A System according to claim 1 wherein the first correction means includes 8-bit quantizing means (1), non-linear predistortion means (12), and first signal control means (11) being arranged before said digital store (14);
and the second correction means, arranged after the digital store (14) includes a signal path for luminance signals having luminance control means (18) and a signal path for chrominance signals having chrominance control means (16, 17);
wherein said luminance control means (18) is arranged for individually controlling white, black, and gamma balance.

11. A System according to claim 10, wherein said chrominance control means comprise at least one of: linear matrix circuits;
non-linear matrix circuits.

12. A System according to claim 10, wherein said chrominance control means (16, 17) comprise further circuits for gamma, black, and white control of the individual color difference signals.

13. A System according to claim 1 wherein contour correction means (28) are arranged directly coupled to the digital store (14) and
wherein the output signal of said contour correction means is added to the luminance signal (Y) after correction in said second signal correction means (18).

14. A System according to claim 1 wherein the inputs of a color television encoder (19) are connected to the outputs of said second signal correction means (16, 17, 18).

15. A System according to claim 1, wherein the inputs of a RGB-matrix (26) are connected to the outputs of said second signal correction means (16, 17, 18).

16. A System according to claim 1 comprising contour correction means (28) the output signal of which is adjustable as a function of a control signal and storage means (27) for storing said control signal.

17. Method of correcting color errors in color television signals generated by scanning a film by a film scanner with a digital frame store, comprising the steps of
during a first film run, generating video signals by a film scanning means (1), displaying the signals on a color television monitor and generating correcting signals, and writing the generated corrected signals into a frame store (14) after having been corrected,
storing first correction data and data indicating the film position,
reading-out the frame store (14) and correcting the signals being read out from the frame store (14),
storing second correction data,
scanning the film once more to provide a second film run, and during the second film run retrieving the stored first and second correction data according to the actual film position with respect to the scanning means (1) and correcting the signals being written in the frame store (14) as well as the signals being read out of the frame store according to the stored respective first and second correction data.

18. Method according to claim 17, wherein during the first film run one or more film frames are scanned repeatedly.

19. Method of correcting color errors in color television signals generated by scanning a film by a film scanner with a digital frame store, comprising the steps of:
during a first film run displaying the signals on a color television monitor,
correcting the signals being read-out of the digital frame store (35) in order to reduce color errors,
storing the data of said correction,
during a second film run applying said data to correction means, which influence the signals to be written into the digital frame store (35).

20. Color correction system for a television film scanner which includes an opto-electronic scanning device (1) and a digital frame store (35) comprising signal correction means (31, 32) being alternatively switchable (36, 37) into the signal path between the scanning device (1) and the frame store (35) or into the signal path between the frame store (35) and an output terminal (38) of the signal, control means (39, 40; 42) to control the color correction means by control signals, and storage means (41) to store said control signals.

* * * * *